W. COOPER.
CHAIN PUMP BUCKET.

No. 175,431. Patented March 28, 1876.

WITNESSES
Henry N. Miller
C. L. Eurt.

INVENTOR
Wm Cooper
Alexander Mason
By Attorneys

UNITED STATES PATENT OFFICE.

WILLIAM COOPER, OF YPSILANTI, MICHIGAN.

IMPROVEMENT IN CHAIN-PUMP BUCKETS.

Specification forming part of Letters Patent No. 175,431, dated March 28, 1876; application filed February 25, 1876.

*To all whom it may concern:*

Be it known that I, WM. COOPER, of Ypsilanti, in the county of Washtenaw and in the State of Michigan, have invented certain new and useful Improvements in Chain-Pump Buckets; and do hereby declare that the following is a full, clear, and exact description thereof, reference being had to the accompanying drawing, and to the letters of reference marked thereon, making a part of this specification.

My invention relates to that class of chain-pump buckets which have a rubber disk or its equivalent placed on or around a central link; and it consists in providing such rubber with one or more circumferential grooves of suitable depth to form two or more bearing-edges and one or more air-chambers, as will be hereinafter more fully set forth.

In order to enable others skilled in the art to which my invention appertains to make and use the same, I will now proceed to describe its construction and operation, referring to the annexed drawing, in which—

Figure 1:
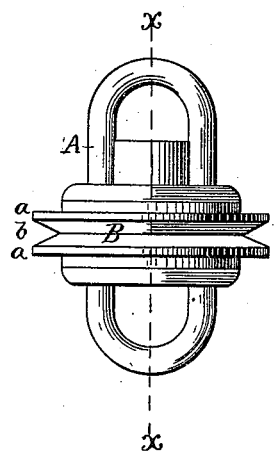
Figure 2:
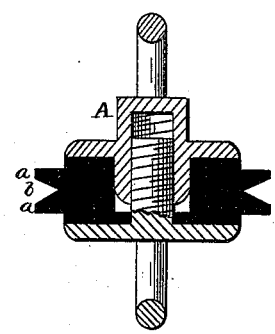

Figure 1 is a side elevation of a chain-pump bucket embodying my invention. Fig. 2 is a vertical section of the same through the line $x\ x$.

A represents the central link constructed in any suitable manner, and B is the rubber secured on the same. This rubber is formed with a circumferential groove of suitable depth to form two bearing-edges, $a\ a$, and an air-chamber, $b$, between them. By this means there is less friction on the tube, and the air-chamber between the bearing-edges creates a powerful suction. The bucket thus constructed can run both ways—or both up and down.

If desired, more than one circumferential groove may be formed in the rubber B, thus increasing the number of bearing-edges and air-chambers.

Having thus fully described my invention, what I claim as new, and desire to secure by Letters Patent, is—

In a chain-pump bucket, the combination of one or more rubber disks, B, provided with V-shaped circumferential grooves and projecting bearing-edges $a\ a$, and clasped between two metal disks, so that the bearing-edges extend beyond the metal which holds the rubber disk, substantially as and for the purposes herein set forth.

In testimony that I claim the foregoing I have hereunto set my hand this 12th day of February, 1876.

WM. COOPER.

Witnesses:
 JOHN A. AMUNDSON,
 R. H. GOVE.